March 2, 1943.　　　T. STEPHENSON　　　2,312,599
REGISTER MOUNT
Filed Aug. 18, 1941　　　2 Sheets-Sheet 1
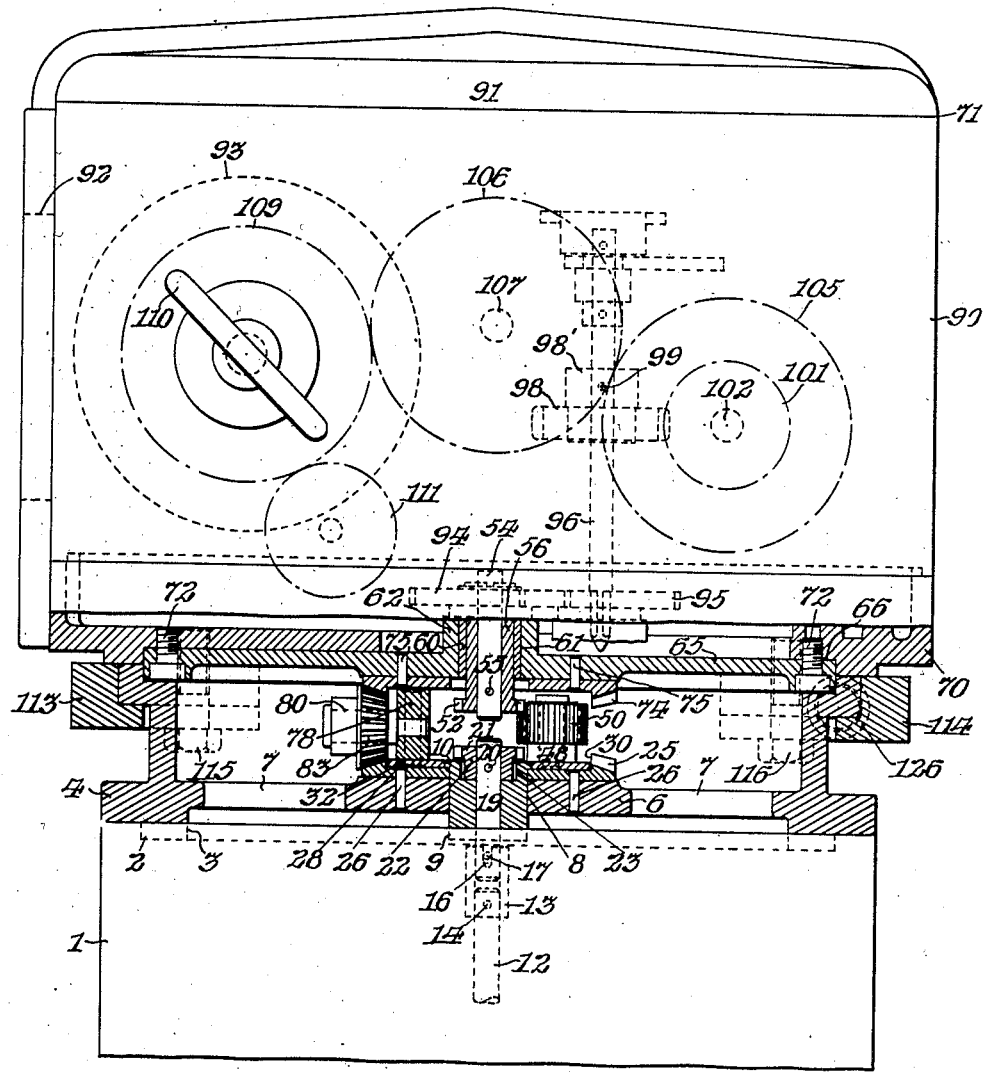
FIG. I.
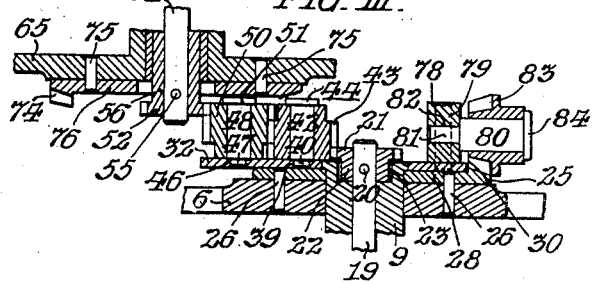
FIG. III.
INVENTOR:
Tom Stephenson,
BY

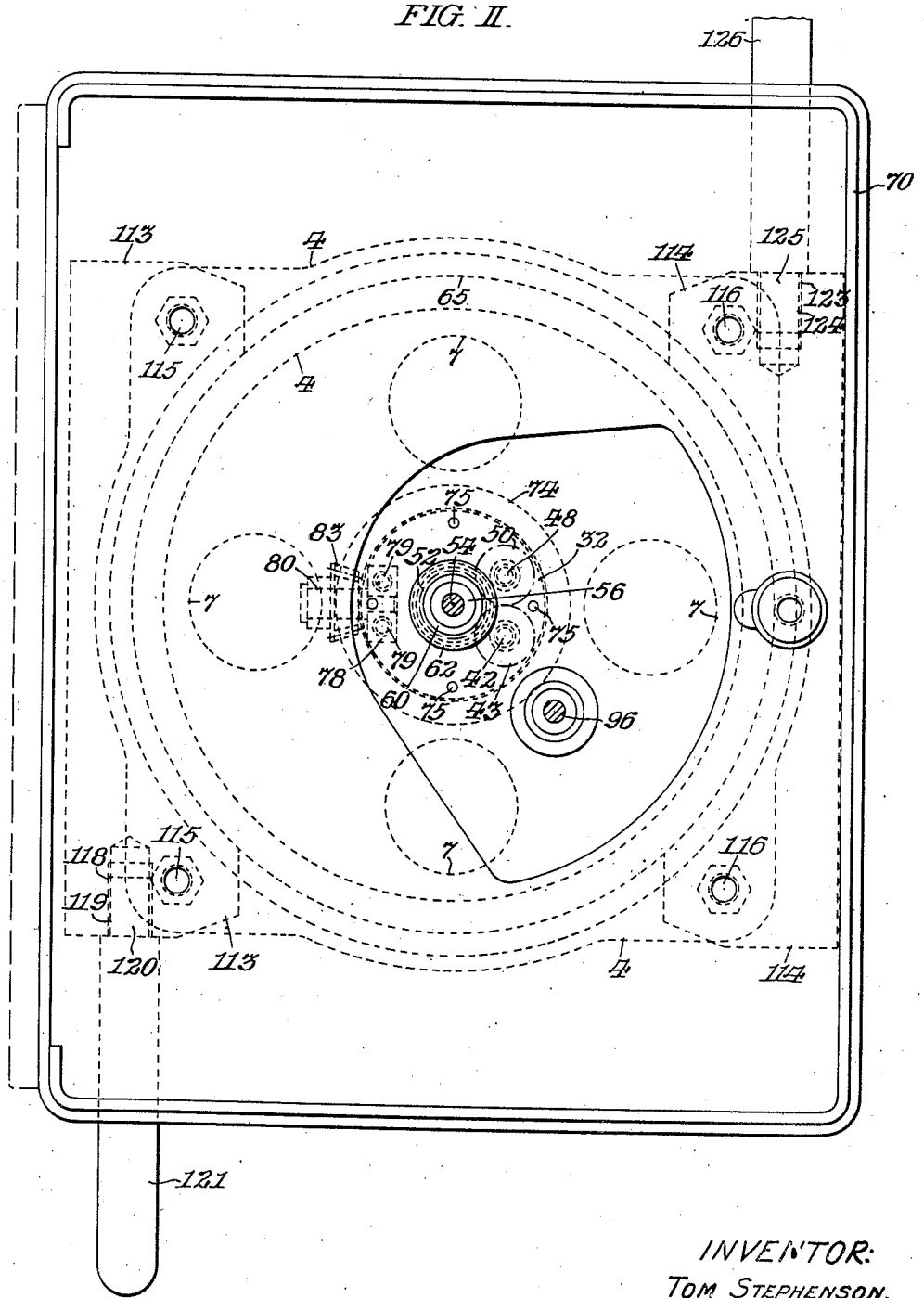

Patented Mar. 2, 1943

2,312,599

UNITED STATES PATENT OFFICE 2,312,599

REGISTER MOUNT

Tom Stephenson, West Hartford, Conn., assignor, by mesne assignments, to Veeder-Root Incorporated, Hartford, Conn., a corporation of Connecticut Application August 18, 1941, Serial No. 407,303

2 Claims. (Cl. 235—1)

My invention relates to improvements in swivel base attachments for register mechanisms of any of the well-known types and which ordinarily include a plurality of indicia wheels and tens-transfer mechanism for indicating visibly the volume of fluid dispensed by a meter. Such register mechanisms are adapted for connection to and driven by the meters by which the volume of fluid dispensed is measured.

Ordinarily the register mechanism is rigidly connected, conveniently by bolts or cap screws, to the top of the meter. In many instances it is necessary to install such an integrally connected meter and register in such a position that it is impossible for an observer to read easily the recordings of the register, because of the fact that the face of the register is at an angle or obscured by pipes or other mechanisms.

Said meters and registers are also in common use on truck bulk delivery tank wagons. The meter and register is ordinarily installed at the side of the motor truck with the face of the register in a plane parallel to the longitudinal axis of the motor truck. In many instances deliveries are made in narrow driveways from such trucks, and where there is a minimum amount of clearance between the sides of the truck and the walls of the buildings contiguous to opposite sides of the driveway. Under such circumstances, it is difficult, and sometimes impossible, for the operator to observe the recording on the register because the opening of the register faces the building walls and, as stated above, the register can be read accurately by the observer only when he is in a position in which he would be facing the register.

It is an object of my invention to provide means, conveniently interposed between the meter and the register, to make possible the turning of the register through an arc of 360°, and thus permit the face of the register to be presented in any direction.

Another object of my invention is the inclusion of means for preventing the changing of the readings on the dials of the register regardless of either the direction of such a turning of the register or the number of degrees of the arc through which the register is turned.

My invention is adaptable for use not only in connection with recording registers alone mounted on meters, but also is particularly adapted for use where a combined register and printing mechanism, for example such as shown in McMullen Letters Patent No. 2,086,363, is connected to the meter and by which both the registering mechanism and the ticket printing mechanism are driven.

My invention includes the various novel features of construction and arrangement hereinafter more definitely specified.

Fig. I is a side elevation, partly in section, of the swivel base mechanism interposed between the register and the top of the meter, or meter adaptor.

Fig. II is a plan view of the swivel base mechanism, with the register removed therefrom.

Fig. III is an artificial sectional view of the gear train of the swivel base mechanism showing the gear train extended to more clearly indicate the relationship of the various gears.

Referring to said drawings; the top of the meter 1, or meter adaptor, is conveniently provided with the reduced offset portion 2 for engagement with the flange 3 formed at the bottom of the base 4, which houses the swivel mechanism. Said base 4 is provided at its bottom end with the web 6 having a series of openings 7 therethrough. Said web 6 is provided with the central opening 8 into which is press-fitted the bushing 9 having the enlarged upper flange 10. The upper end of the meter shaft 12 carries the coupling member 13, conveniently rigidly fastened thereto by means of the pin 14. The upper end of said coupling 13 is provided with diametrically opposite slots 16 for engagement in driving relation with the driving pin 17 rigidly fastened to the shaft 19 which is journaled in said bushing 9.

Said shaft 19 has rigidly fastened thereto at its upper end, conveniently by the pin 20, the pinion gear 21. Said pinion gear 21 is provided with the hub 22 which is loosely fitted in the annular recess 23 formed in the upper end of said bushing 9.

The bevel ring gear 25 is mounted on the web 6 of the base member 4 in axial relation therewith, and said bevel ring gear 25 is rigidly fastened to said web by means of the series of pin rivets 26 extending through said web and the annular flange 28 of said bevel ring gear.

Said ring gear 25 is provided with the annular recessed portion 30 and in which there is fitted, with freedom of turning movement, the gear plate or disk 32. Said gear plate 32 has the axial opening 33 formed therein so that said gear plate 32 is free to rotate about the flange 10 of the bushing 9.

Said gear plate 32 is provided with the hole 39 into which is fitted and riveted the reduced portion 40 of the stud shaft 42 so that said shaft 42 is integrally connected to said gear plate 32. Said stud shaft 42 has journaled thereon the planetary pinion gear 43, the lower portion of which gear is in mesh with said pinion gear 21. Said gear 43 is prevented from axial displacement by means of the enlarged head 44 formed at the upper end of the stud shaft 42.

Said gear plate 32 is provided with the hole 46 into which is fitted and riveted the reduced portion 47 of the stud shaft 48 so that said shaft 48 is likewise integrally connected to said gear plate 32. Said stud shaft 48 has journaled thereon the planetary pinion gear 50, of the same pitch diameter as the planetary pinion gear 43, and said gear 50 meshes with said gear 43. Said gear 50 is prevented from axial displacement by means of the enlarged head 51 formed at the upper end of said stud shaft 48.

The upper end of the planetary gear 50 is engaged by the pinion gear 52, of the same pitch diameter as the planetary gears 50 and 43. Said pinion gear 52 is rigidly mounted on the register drive shaft 54 by means of the pin 55 which extends through said shaft 54 and the hub 56 of the pinion gear 52.

Said gear hub 56 is journaled in the bearing sleeve 60, which sleeve is press-fitted into integral relation with the axial opening 61 formed in the hub 62 of the register bottom closure plate 65. Said closure plate is rigidly mounted in the annular offset recess 66 formed in the base 70 of the register 71. Said closure plate 65 is conveniently connected to said register base 70 by a series of screws 72, two of which are shown in Fig. I.

The bevel ring gear 74 is mounted on the register bottom closure plate 65 in axial relation therewith, and said bevel ring gear 74 is rigidly fastened to said plate 65 by means of a series of pin rivets 75 extending through said plate and the annular flange 76 of said bevel ring gear 74.

Said gear plate 32 has rigidly mounted thereon the gear mount 78 which is conveniently fastened to said plate 32 by means of rivet pins 79, one of which is shown in Fig. III. The stud shaft 80 is provided with the reduced portion 81 which extends through the hole 82 formed in the gear block 78, and said stud shaft is maintained in rigid relationship with said block 78 by riveting over the end of the reduced portion 81. Said stud shaft 80 has journaled thereon the bevel pinion gear 83, which gear is prevented from axial displacement by means of the enlarged head 84 formed at the outer end of the stud shaft 80. Said bevel pinion 83 meshes between the upper bevel ring gear 74 and the lower bevel ring gear 25. When the register 71 is in a stationary position, said bevel pinion 83 prevents from turning the gear plate 32 and the gears 43 and 50 mounted thereon. Said bevel ring gears 25 and 74, and the pinion 83, do not rotate when the register remains stationary.

The register 71 is mounted on the register base 70 and includes the middle section 90 and top closure 91. Said middle section 90 is provided at the front thereof with a glass-enclosed opening 92 to permit visibility of the series of register indicia wheels 93, one of which is indicated in Fig. I. Said registering mechanism is of the well-known type and includes the gear 94 rigidly mounted at the opposite end of the shaft 54. Said gear 94 is in driving connection with the gear 95 mounted on the lower end of the shaft 96 which is journaled in a boss formed on the bottom closure of the mechanism. Said shaft 96 carries, intermediate of its length, the helical gear 98 which is fastened to the shaft 96, conveniently by means of the pin 99 in the hub 98' of said gear 98. Said helical gear 98 is in engagement with the gear 101 fastened to the shaft 102, the axis of which is at right angles to the axis of the shaft 96. Said shaft 102 may be conveniently journaled in the side wall members of the registering mechanism.

Said shaft 102 carries the gear 105 which is in engagement with the idler gear 106 mounted for freedom of turning movement on the shaft 107 which is conventionally shown in dotted lines in said Fig. I. Said gear 106 is in engagement with the gear 109 carried by the indicia wheel of lowest order, which is the indicia wheel indicated in Fig. I. The shaft 102 is provided with a clutch of any of the well-known types so as to permit disengagement of the driving connection between the gear 101 and the gear 105 during the resetting operation of the counter mechanism by means of the crank handle 110 indicated in Fig. I. The counter mechanism diagrammatically indicated is of the well-known conventional type and including tens-transfer pinions 111.

Said register base 70 is provided with two bracket members 113 and 114 which are respectively conveniently fastened to said register base 70 by means of the cap screws 115 and 116. Said bracket 113 is provided with the female threaded opening 118 for engagement with the male screw thread 119 formed on the reduced portion 120 of the handle 121. Said bracket member 114 is provided with the female screw threaded opening 123 for engagement with the male screw thread 124 formed on the reduced portion 125 of the handle 126. Said handles 121 and 126 are provided as convenient means for effecting rotating movement of the register 71.

*Operation*

When it is desired to rotate the register 71 so as to present the window 92 in a position in which it would be more convenient for the operator to observe the readings on the indicia wheels of the register, turning movement of the register may be effected by the operator turning the register by means of either or both of the handles 121 and 126.

Merely for purposes of clarity, it will be assumed that in the following description of operation the register is turned one complete turn clockwise on its axis from the position shown in Fig. II. A turning of the register clockwise one complete revolution also causes the bevel ring gear 74 to likewise turn one complete revolution clockwise because of the fact that said bevel ring gear 74 is fastened by means of the pin 75 to the bottom closure plate 65 which is integrally connected with the register base 70 by means of the series of screws 72. Clockwise turning movement of the bevel ring gear 74 causes the bevel pinion gear 83 to roll around on the teeth of the bevel ring gear 25. As the bevel gear 83 is mounted on the stud 80 carried by the gear mount 78 rigidly connected to the gear plate, or disk, 32, rotation of the bevel gear 83 will cause the gear plate 32 to rotate on its axis through one-half revolution, or 180°. Said gear plate 32, in rotating one-half revolution around the flange 10 of the bushing 9, will carry with it the planetary pinions 43 and 50 journalled on their respective stud shafts 42 and 48 which are rigidly mounted in said gear plate 32. Said pinion 43, rolling around the pinion 21, which remained stationary, will have made one full turn, with respect to the pinion 21, as the plate 32 is rotated on its axis one-half turn, or 180°. The pinion 50, in mesh with said pinion 43, will not have made any rotation with respect to the pinion 21, although the relative positions of said pinions 50 and 21 have been changed. The movement of the axis of said pinion 50 around the pinion gear 52 for 180° in a clockwise direction because of the movement of said gear plate 32 through an arc of 180°, causes the pinion 52 to rotate one complete revolution in a clockwise direction also.

Therefore, since both the bevel ring gear 74 and the pinion gear 52 will have each made one turn in a clockwise direction, there would be no relative motion between said two gears 52 and 74 and, hence, there would be effected no change in the indicating wheels 93 of the register.

If the drive pinion 21 should also be turning, at the same time a manual rotation of the register is being effected, only such displacement of the pinion 21 will be imposed upon the pinion 52, relative to the bevel ring gear 74. Therefore, there is transmitted to the gearing of the register only such movement between the gears 52 and 21 as would be effected if the register was remaining in a stationary position. It also is obvious that rotation of the register 71 on its swivel base may be effected in either direction without effecting the registration on the indicia wheels of the register.

Therefore, I do not desire to limit myself to the precise details of construction and arrangement herein set forth, as it is obvious that various modifications may be made therein without departing from the essential features of my invention, as defined in the appended claims.

I claim:

1. In swivel mechanism for register mechanisms which include a drive shaft connected by a train of gearing to a plurality of indicia wheels and tens-transfer mechanism; the combination of a swivel base member; with register mechanism having a base member adapted to be supported by and rotate on said swivel base; a drive gear for said register mechanism; a driver gear mounted on a drive shaft rotated by fluid passed by a meter; a gear plate rotatable about the axis of said meter driver gear; planetary gearing means mounted on and carried by said plate rotatable about the axis of said meter driver gear, connecting said meter driver gear with said register mechanism drive gear; a first ring gear rigidly mounted on and carried by said register base; a second ring gear mounted on said swivel base member; and gearing means, carried by said gear plate, connecting said first ring gear and said second ring gear; whereby said register mechanism, with its base member, may be rotated on its axis without effecting change of the readings on said indicia wheels of said register.

2. A structure as in claim 1, wherein said gear plate is supported by said second ring gear and in axial alinement therewith.

TOM STEPHENSON.